United States Patent Office 3,450,769
Patented June 17, 1969

3,450,769
VAPOR-PHASE ALDOL CONDENSATION
OF ACETALDEHYDE
Jackie E. Payne, 1952 Johnston Place, Bartlesville, Okla. 74003, and Larry D. Hinson, Kingsville, Tex. (% Celaness Chemical Company, Bishop, Tex. 78343)
No Drawing. Filed Sept. 7, 1967, Ser. No. 665,974
Int. Cl. C07c 45/00, 47/20
U.S. Cl. 260—601                                12 Claims

ABSTRACT OF THE DISCLOSURE

Crotonaldehyde is produced by bringing vapors of aqueous acetaldehyde (AcH) into contact with a catalyst comprising at least one member of the group consisting of lithium aluminate and zirconium dioxide, and isolating crotonaldehyde from the resulting reaction mass. The aqueous acetaldehyde contains AcH and water in a weight ratio of from ca. 0.25 to ca. 4.0, e.g., from 1 to 4. The temperature in the reaction zone may range up to ca. 800° F., e.g. ca. 200°–800° F., preferably ca. 450°–580° F. The reaction pressure is from 0 to about 20 p.s.i.g., preferably from ca. 5–15 p.s.i.g. Comparative data are given in Table I when $LiAlO_2$ and $ZrO_2$ are compared with other catalysts in this reaction; and in Table II, when compared with each other.

---

This invention relates broadly to the vapor-phase aldol condensation of acetaldehyde, and more particularly to a method of converting acetaldehyde to an unsaturated aldehyde, specifically crotonaldehyde, by a vapor-phase reaction in contact with a particular catalyst.

The aldol condensation reaction is well known in the art, and is used in the production of ethylenically unsaturated carbonyl compounds. Most commonly, this condensation is employed for the reaction of an aldehyde, in an alkaline medium, with a compound carrying an active (activated) hydrogen atom, e.g., with itself, with another aldehyde, with a ketone such as methyl ethyl ketone or acetone, or with a nitroparaffin such as nitromethane or nitroethane, thereby to produce a compound containing an alcoholic hydroxyl group. It is also well known to subject the resulting hydroxyl compound to a dehydration reaction, especially in the presence of a dehydration catalyst, in order to produce an unsaturated compound. For example, methyl isopropenyl ketone has been obtained by a two-step reaction in which formaldehyde is condensed with methyl ethyl ketone to produce 4-hydroxy-3-methyl butane-2 followed by dehydration of the latter.

It also has been known to condense acetaldehyde (AcH) to acetaldol using an alkaline condensation catalyst and to dehydrate the acetaldol to crotonaldehyde (CrH) with the aid of a dehydration catalyst. This is a liquid-phase, two-step reaction wherein, typically, sodium hydroxide is employed as a catalyst for the reaction and refrigeration is required in order to control the reaction. In the second step the dehydration catalyst is, typically, phosphoric acid.

It is a primary object of the present invention to provide a one-step, vapor-phase method of producing crotonaldehyde from acetaldehyde.

It is a further object of the instant invention to provide a method whereby crotonaldehyde can be produced from acetaldehyde by a method which eliminates the need for the use of an alkaline material such as sodium hydroxide as a condensation catalyst; that eliminates the need for refrigeration to control the reaction; and that also eliminates the use of a dehydration catalyst such as phosphoric acid, and the equipment required in the use of such a catalyst.

Other objects of the invention will be apparent to those skilled in the art from the following more detailed description and from the appended claims.

The objects of the invention are attained by bringing the vapors of acetaldehyde and of water into contact with a catalyst which is at least one member of the group consisting of lithium aluminate ($LiAlO_2$) and zirconium dioxide. (Lithium aluminate is also known under the name of lithium metaaluminate, and its empirical formula is sometimes given as $Li_2Al_2O_4$.)

The reaction temperature ranges up to about 800° F., more particularly within the range of, for instance, from about 200° to about 800° F., and preferably from about 450° to about 580° F. The reaction pressure is within the range of, for example, from zero (0) to about 20 p.s.i.g., and preferably from about 5 to about 15 p.s.i.g.

The weight ratio of acetaldehyde to water in the aqueous acetaldehyde that is vaporized in practicing this invention may be from about 0.25 to about 4, respectively (i.e., as low as 1 part acetaldehyde to 16 parts water). However, from the standpoint of process efficiency, it is desirable that the weight ratio of AcH:water in the aqueous acetaldehyde be within the range of from about 1 to about 4, respectively; that is, a weight percentage concentration of acetaldehyde in the aqueous acetaldehyde charged to the reactor of from about 20% to about 80%, more particularly from about 35 or 40% to 75 or 80%. Good results can be obtained when the weight percentage concentration of AcH in the aqueous acetaldehyde is within the range of from about 65% to about 75%.

Desirably the catalyst is carried on a support which may be, for instance, silica gel, alumina, kieselguhr, aluminum silicate and others known in the art, but which is preferably silica gel. The concentration of catalyst on the support may range, for example, from about 10% to about 20%, based on the total weight of the catalyst and the support, but which is usually about 10–12% on this same basis.

The $ZrO_2$ catalyst can be prepared, for example, by impregnating the catalyst support to be used, e.g., silica gel, with an aqueous solution of $Zr(SO_4)_2$ at approximately 40° C., drying the impregnated support at about 105° C. for about 6 hours, and then heating the dried product in an oxidizing atmosphere at approximately 600° C. for about 8 hours.

The lithium aluminate catalyst can be made, for instance, by reaction of LiOH with $Al_2O_3$. The resulting catalyst, however, contains high, residual alkalinity which is undesirable in the reaction with which this invention is concerned. A lithium aluminate catalyst that has low residual alkalinity can be prepared, for example, by calcining an aluminum salt such as the sulfate with $LiCO_3$. The lithium aluminate catalyst can be formed in situ on a support, e.g., silica gel, in known manner.

The catalysts used in the tests hereafter described were obtained from Davison Chemical Division, W. R. Grace & Company, Baltimore, Md. 21203.

In Table I that follows there are given the results of tests with lithium aluminate and zirconium dioxide as compared with other catalysts in a vapor-phase condensation reaction of aqueous acetaldehyde to crotonaldehyde.

One run was made with each of these catalysts using the same feed rate, AcH to water ratio, catalyst volume and reactor pressure. The reactor temperature, although held at a high level, was not held constant (100° F. variation on the reactor outlet) since the interest was only in the main effects.

A stainless steel reactor was designed and fabricated to make these runs. The reactor was 1" I.D. 16" in length, and was fitted with three sealed thermocouples. The reactor was flanged at both ends and was fitted with a pressure gauge on the inlet. A needle valve on the outlet was used to control the pressure. The top and bottom valves of the reactor were separately wound with resistance heating tape in order to independently control the temperature above and within the catalyst bed. The void space above the catalyst was filled with stainless steel ball bearings for better heat transfer. For isothermal control, more heat was required for the free space above the catalyst bed. This was due to exothermic heat of reaction within the bed.

outlet thereof. In these runs the feed rate of the aqueous acetaldehyde that was vaporized corresponds to from 4 ml. to about 8 ml. per minute. Instead of using lithium aluminate or zirconium dioxide alone as the catalyst, one may use mixtures of lithium aluminate and zirconium dioxide in any proportions on the same or on a different support.

The desired product, crotonaldehyde, is isolated from the reaction mass in any suitable manner. "Low boilers" from the process consist mainly of unreacted acetalde- TABLE I.—COMPARISON OF LITHIUM ALUMINATE AND ZIRCONIUM DIOXIDE WITH OTHER CATALYSTS

| Catalyst | Av. inlet temp. (° F.) | Av. center temp. (° F.) | Av. outlet temp. (° F.) | Feed rate, ml./min. | Feed comp., wt. percent AcH | gms./100 in product CrH | gms./100 in product High boilers | Catalyst vol. (ml.) | Ratio of CrH to high boilers |
|---|---|---|---|---|---|---|---|---|---|
| 10% LiAlO$_2$ | 220 | 420 | 680 | 5 | 75 | 6.6 | 0.53 | 120 | 12.5 |
| 10% ZrO$_2$ | 175 | 380 | 675 | 5 | 75 | 7.5 | 0.76 | 120 | 9.9 |
| 9.5% ZnO, 0.5% Bi$_2$O$_3$ | 200 | 385 | 655 | 5 | 75 | 7.5 | 0.94 | 120 | 8.0 |
| 10% Ca(AlO$_2$)$_2$ | 185 | 400 | 670 | 5 | 75 | 4.4 | 0.49 | 120 | 9.0 |
| 10% Cr$_2$O$_3$ | 260 | 480 | 725 | 5 | 75 | 3.7 | 0.96 | 120 | 3.9 |
| 9.5% MgO, 0.5% Ta$_2$O$_5$ | | 450 | 725 | 5 | 75 | 8.3 | 1.80 | 120 | 4.6 |
| WO$_3$ | | 435 | 725 | 5 | 75 | 6.3 | 1.90 | 120 | 3.3 |
| 10% Ta$_2$O$_5$ | | 460 | 730 | 5 | 75 | 5.9 | 0.81 | 120 | 7.3 |
| Al$_2$O$_3$ | | 525 | 780 | 5 | 75 | 4.4 | 1.10 | 120 | 4.0 |

The best weight percent efficiency and weight percent conversion obtained were 89.9 and 14.6, respectively (see Table II). These were obtained with lithium aluminate. It may here be mentioned that the weight percent efficiency is calculated as follows:

$$\frac{\text{Gms./100 ml. CrH} \times 100}{\text{Gms./100 ml. CrH+Light Ends+High Boilers}}$$

In order that those skilled in the art may better understand how the present invention can be carried into effect, the following examples are given by way of illustration and not by way of limitation.

Examples 1–15

The apparatus and general procedure were the same as hereinbefore described with reference to the evaluation of a variety of catalysts including lithium aluminate and zirconium dioxide with the exception that reaction temperatures were more closely controlled, and the operating conditions such as feed rate, feed composition (ratio of AcH to H$_2$O) and operating pressure were varied to note their effect upon the efficiency and conversion percentages.

The operating data and results are given in Table II that follows:

hyde. However, carbon monoxide, carbon dioxide and low-boiling, saturated and unsaturated hydrocarbons also have been found to be present. The "high boiler" associated with the process include, for example, paraldehyde, 2-vinylcrotonaldehyde, 2,4-hexadienal, cis and trans crotonaldehyde dimers, 2,6-dimethyl-4-(1-propenyl)-1,3(5-trioxane and 2,4,6-trimethyl-5-carboxaldehyde-1,3-dioxane.

One suitable method of isolating the desired crotonaldehyde product is briefly described below:

The products of the reactor (i.e., reaction products) are condensed at approximately 45° F. with the condenser vented to a scrubber. The condensed reaction products are fed to a 55-tray fractional distillation column at about tray 30. The unreacted acetaldehyde is removed as a distillate product, condensed, and recycled (admixed with fresh feed) to the reactor. The receiver, in which crotonaldehyde product from the distillation column is collected, is also vented to the aforementioned vent scrubber.

The high boilers are removed from the distillation column as a residue product, and the desired crotonaldehyde product is removed as its azeotrope with water at about tray 5 of the same column.

Fresh condensate is fed to the vent scrubber near its top, and the water residue from this scrubber is used as water make-up for the feed of acetaldehyde and water that is charged to the reactor.

TABLE II.—COMPARISON OF LiAlO$_2$ AND ZrO$_2$ CATALYSTS

| Ex. No. | Catalyst | Center temp. (° F.) | Outlet temp. (° F.) | Approx. feed rate (ml./min.) | Approx. feed comp.(AcH/H$_2$O) | Press. (p.s.i.g.) | Catalyst volume (ml.) | Wt. percent eff. | Wt. percent conv. |
|---|---|---|---|---|---|---|---|---|---|
| 1 | LiAlO$_2$ | 525 | 525 | 6.1 | 1.67 | 10 | 120 | 84.8 | 5.5 |
| 2 | LiAlO$_2$ | 565 | 565 | 4.5 | 2.2 | 15 | 120 | 89.9 | 14.6 |
| 3 | LiAlO$_2$ | 475 | 475 | 4.3 | 2.2 | 5 | 120 | 89.5 | 6.4 |
| 4 | LiAlO$_2$ | 575 | 575 | 7.4 | 2.2 | 5 | 120 | 88.6 | 6.4 |
| 5 | LiAlO$_2$ | 480 | 480 | 8.0 | 2.2 | 15 | 120 | 86.8 | 11.2 |
| 6 | LiAlO$_2$ | 465 | 465 | 8.8 | 1.13 | 5 | 120 | 76.2 | 2.6 |
| 7 | LiAlO$_2$ | 575 | 575 | 4.7 | 1.13 | 5 | 120 | 87.0 | 6.7 |
| 8 | LiAlO$_2$ | 570 | 570 | 8.2 | 1.13 | 15 | 120 | 88.4 | 4.9 |
| 9 | LiAlO$_2$ | 475 | 475 | 4.9 | 1.13 | 15 | 120 | 88.4 | 4.8 |
| 10 | LiAlO$_2$ | 525 | 525 | 6.5 | 1.66 | 10 | 120 | 90.4 | 5.4 |
| 11 | ZrO$_2$ | 515 | 515 | 6.5 | 1.67 | 10 | 120 | 81.8 | 9.1 |
| 12 | ZrO$_2$ | 580 | 580 | 4.3 | 2.2 | 15 | 120 | 69.8 | 11.0 |
| 13 | ZrO$_2$ | 475 | 475 | 4.7 | 2.2 | 5 | 120 | 81.4 | 12.8 |
| 14 | ZrO$_2$ | 575 | 575 | 7.9 | 2.2 | 5 | 120 | 75.6 | 10.8 |
| 15 | ZrO$_2$ | 475 | 475 | 8.0 | 2.2 | 15 | 120 | 84.8 | 5.5 |

From a consideration of the data given in Table II it will be noted that, in carrying out the described runs, the acetaldehyde and water were present in the feed in a weight ratio of from about 1.1 to about 2.2, respectively; and that the temperature in the reaction zone was within the range of from about 465° F. to about 580° F. at approximately the center of the said zone and, also, at the It is to be understood that the foregoing detailed description is given merely by way of illustration and that many variations may be made therein without departing from the spirit of our invention.

The embodiments of the invention in which an exclusive property or privilege is claimed are defined as follows:

1. The method of producing crotonaldehyde which comprises bringing vapors of aqueous acetaldehyde into contact with a catalyst consisting essentially of at least one member of the group consisting of lithium aluminate and zirconium dioxide, and isolating crotonaldehyde from the resulting reaction mass.

2. The method as in claim 1 wherein the catalyst is lithium aluminate carried on a support therefor.

3. The method as in claim 1 wherein the catalyst is zirconium dioxide carried on a support therefor.

4. The method as in claim 2 wherein the support is silica gel.

5. The method as in claim 3 wherein the support is silica gel.

6. The method as in claim 1 wherein vaporous acetaldehyde admixed with water vapor is derived from an aqueous solution of acetaldehyde containing acetaldehyde and water in a weight ratio of from about 0.25 to about 4.0, respectively, and the temperature in the reaction zone is within the range of from about 200° F. to about 800° F.

7. The method as in claim 6 wherein the aqueous solution of acetaldehyde contains acetaldehyde and water in a weight ratio of from about 1 to about 4, respectively.

8. The method as in claim 6 wherein the weight percentage concentration of acetaldehyde in the aqueous solution of acetaldehyde is from about 35% to about 75%; the temperature in the reaction zone is from about 450° F. to about 580° F.; and the vapors are passed over a bed of catalyst under a pressure of from 0 to about 20 p.s.i.g.

9. The method as in claim 6 wherein the acetaldehyde and water are in a weight ratio of from about 1.1 to about 2.2, respectively, the catalyst consisting essentially of lithium aluminate or zirconium dioxide on a silica gel support; the temperature in the reatcion zone is within the range of from about 450° F. to about 580° F.; and the feed rate of aqueous acetaldehyde that is vaporized corresponds to from about 4 ml. to about 8 ml. per minute.

10. The method as in claim 1 wherein vaporous acetaldehyde admixed with water vapor is derived from an aqueous solution containing acetaldehyde and water in a weight ratio of from about 1.1 to about 2.2, respectively; the said vapors are passed over a bed of catalyst under a pressure of from about 5 to about 15 p.s.i.g.; the catalyst consisting essentially of lithium aluminate or zirconium dioxide on a silica gel support; and the temperature in the reaction zone is within the range of from about 465° F. to about 580° F. at approximately the center of the said zone and, also, at the outlet thereof.

11. The method as in claim 10 wherein the catalyst consist essentially of about 10% lithium aluminate on a silica gel support, said perecntage being based on the total weight of the catalyst and the support.

12. The method as in claim 10 wherein the catalyst consist essentially of about 10% zirconium dioxide on a silica gel support, said percentage being based on the total weight of the catalyst and the support.

References Cited

Czarny, Z., Chemical Abstracts, vol. 62, 6386–6387, 1965.

LEON ZITVER, *Primary Examiner.*

R. H. LILES, *Assistant Examiner.*